United States Patent [19]

Black et al.

[11] 4,109,971
[45] Aug. 29, 1978

[54] DETACHABLE ROAD PROTECTING DEVICES FOR TRACKED VEHICLES

[76] Inventors: Chester A. Black, 6303 W. 159th St. Rte. #1, Stilwell, Kans. 66085; Lester A. Black, 1106 Second St., Alva, Okla. 73717

[21] Appl. No.: 731,725

[22] Filed: Oct. 12, 1976

[51] Int. Cl.² ............................................. B62D 55/28
[52] U.S. Cl. ..................................................... 305/51
[58] Field of Search ................... 305/51, 46; 114/219; 256/13.1

[56] References Cited

U.S. PATENT DOCUMENTS

| 3,447,794 | 6/1969 | Sudyk | 114/219 X |
| 4,027,925 | 6/1977 | Black et al. | 305/51 X |
| 4,030,706 | 6/1977 | Ward | 114/219 X |

FOREIGN PATENT DOCUMENTS

| 1,035,422 | 4/1953 | France | 305/51 |
| 1,680,332 | 7/1971 | Fed. Rep. of Germany | 305/51 |
| 794,074 | 4/1958 | United Kingdom | 305/51 |

Primary Examiner—Robert B. Reeves
Assistant Examiner—John P. Shannon
Attorney, Agent, or Firm—Scofield, Thomas M.

[57] ABSTRACT

Improvements in road-protecting devices for tracked vehicles which are removably secureable to individual elements of the tracks; heavy-duty road-protecting devices removably secureable to individual segments or elements of endless tracks which permit the tracked vehicle to be actually worked under heavy load without losing the removably secured device; improved apparatus for tensioning and connecting such road-protecting devices on and in engagement with the individual segments or elements of endless tracks where such apparatus permits a limited knuckle or working action of the device during securement; such improved road-protecting devices formed or composed entirely of resilient, deformable yet shape-retaining rubber or plastic, which do not require therewith conventional base or cover plates or the usual bolts or ties associated therewith; such devices having non-extensible elements of rigid or non-rigid character fully received within the bodies thereof, such elements, although within the load thrust zones of the device being not vulnerable to such load thrusts, the non-extensible elements cooperating with additional tensioning and connecting devices, the latter located out of and protected from the stress and load thrust vectors of use.

20 Claims, 14 Drawing Figures

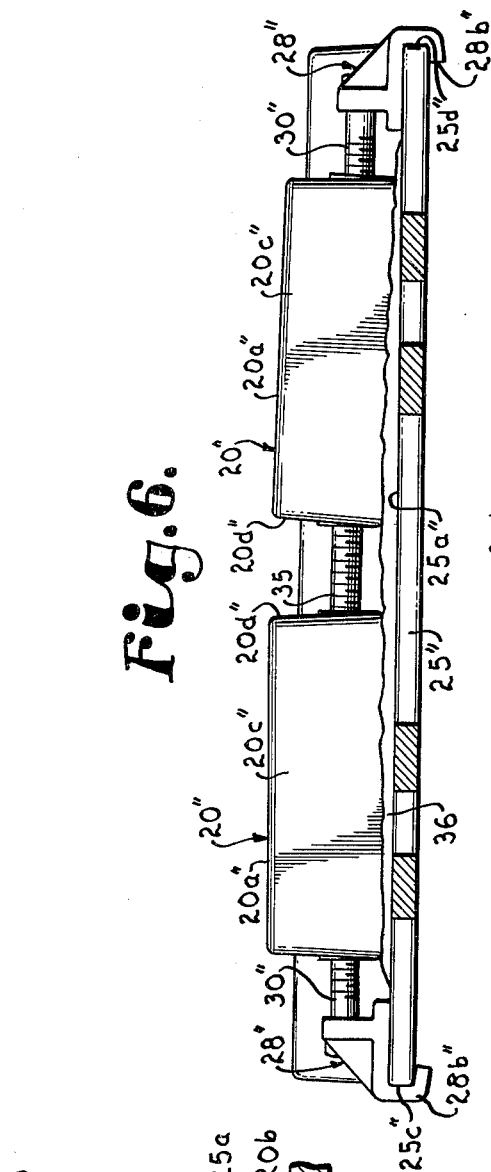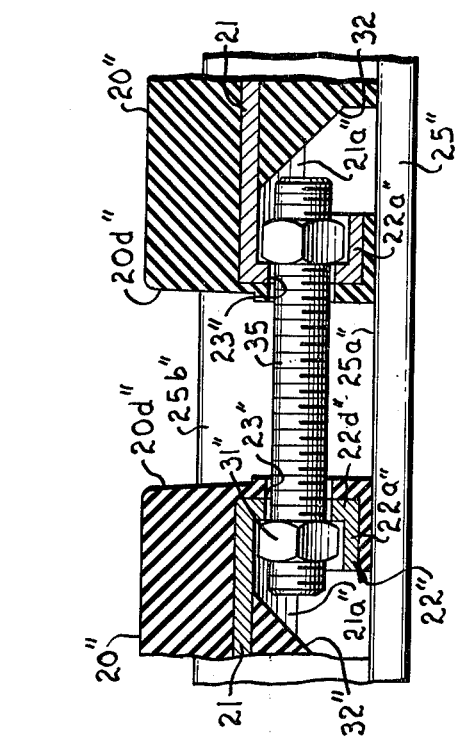

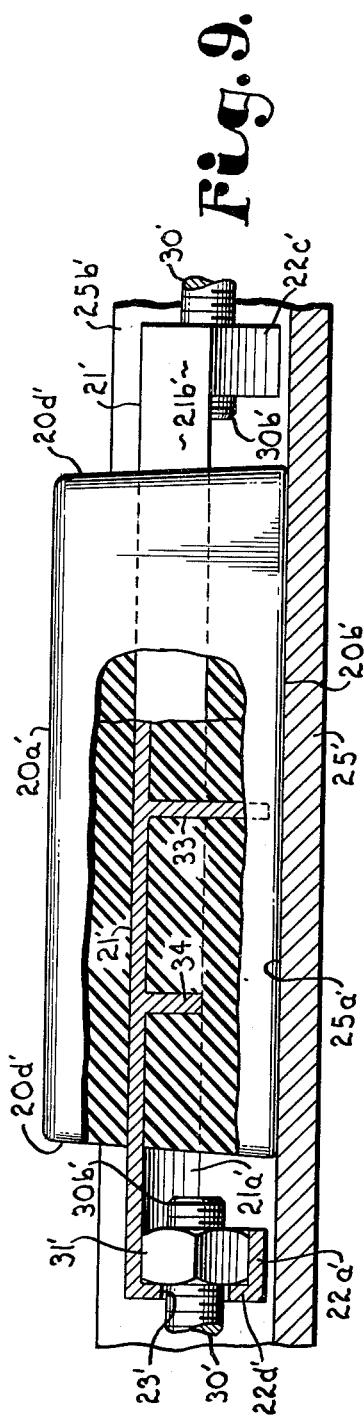
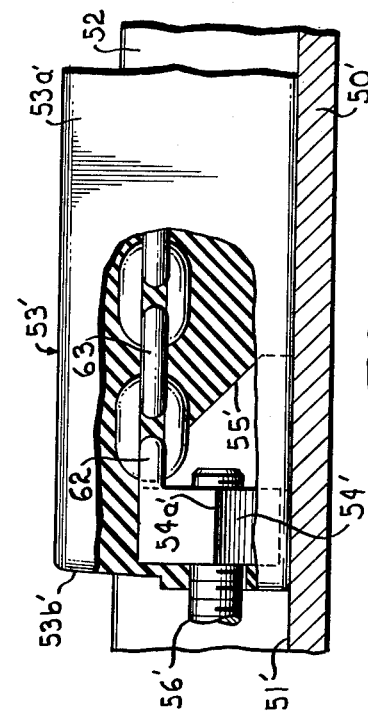
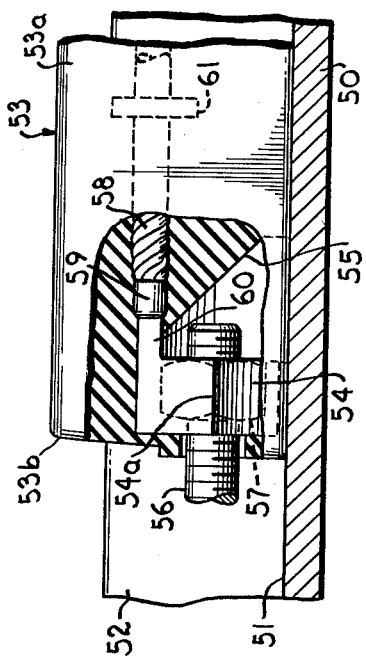
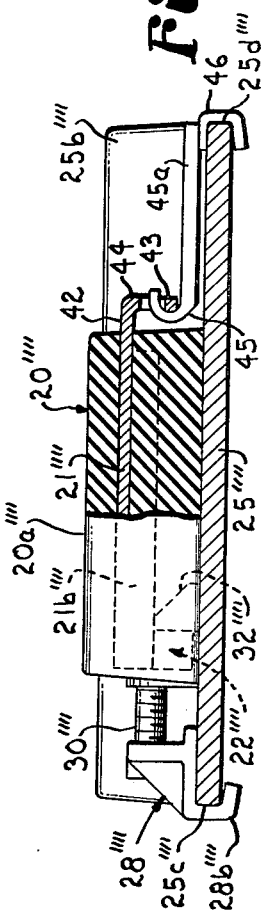

DETACHABLE ROAD PROTECTING DEVICES FOR TRACKED VEHICLES

THE PRIOR ART

This application is an improvement over U.S. patent application Ser. No. 469,092, filed May 13, 1974 for "Detachable Road Protecting Device For Tracked Vehicles", inventors Chester A. and Lester A. Black, this application, now abandoned continued as U.S. patent application Ser. No. 590,617, filed June 26, 1975, now U.S. Pat. No. 4,027,925 issued June 7, 1977. It is additionally an improvement over the subject matter of the Black et al U.S. patent application Ser. No. 612,217 filed Sept. 10, 1975 as "Improvements In Detachable Road Protecting Devices For Tracked Vehicles".

The prior art has generated many approaches to the problems of protecting streets, roadways, pavements, and the like against the cleats of endless tracked vehicles. Thus, Benson U.S. Pat. No. 2,369,130, issued Feb. 13, 1945 "Reinforced Rubber Tread For Track Shoes" discloses preferred rubber tread materials to be used with the track shoes of track laying vehicles.

Integrally molded, composite track blocks or elements having resilient material coupled with rigid track elements or structure are seen in numerous patents, for example Leguillon et al. U.S. Pat. No. 2,409,502, issued Oct. 15, 1946 for "Track For Self-Laying Track Type Vehicles". Also see Batur et al. U.S. Pat. No. 3,148,921 "Endless Track Chain And Link", issued Sept. 15, 1964.

Pneumatic tire elements, supports or the like have been provided associated with endless track elements as in Aukland U.S. Pat. No. 2,254,787 "Tractor Tire", issued Sept. 2, 1941 and Sayler U.S. Pat. No. 2,359,586, issued Oct. 3, 1944 for "Traction Devices".

Patents showing resilient pads or tread attachments mounted on or supported by metal plates and molded to individual endless track elements are legion. Representative of these are the patents to White U.S. Pat. No. 1,635,596 "Rubber Tread Attachment For Track Links", issued July 12, 1927; Wadsworth et al. U.S. Pat. No. 3,117,824 issued Jan. 14, 1964 for "Accessory Traction Units"; Wadsworth et al. U.S. Pat. No. 3,058,793 "Accessory Traction Units", issued Oct. 16, 1962; Ruf U.S. Pat. No. 3,017,225 "Track-Chain Link", issued Jan. 16, 1952 and Kaifesh U.S. Pat. No. 3,475,060 issued Oct. 28, 1969 for "Self-Cleaning Track Snow Pad For Track Laying Vehicles".

Predecessor metallic bolt-on units to the latter, called "Street Plates" are seen in the patents to Panzegrau U.S. Pat. No. 2,028,346 "Street Plate For Track Shoes", issued Jan. 21, 1936 and Schmeiser U.S. Pat. No. 2,044,918 "Street Plate For Track Type Tractors", issued June 23, 1936.

A snap-in protective tread element is seen in Baker U.S. Pat. No. 2,686,697 "Tread Construction", issued Aug. 17, 1964.

Street plates and protective pad elements also are known which laterally engage the side edges of a track element, as seen in Reider U.S. Pat. No. 2,161,486 "Street Plate For Tractors", issued June 6, 1939; Saives U.S. Pat. No. 1,568,090 "Endless Track Vehicle", issued Jan. 5, 1926; French Pat. No. 748,081 to LaPorte of June 28, 1933 and Eichweber U.S. Pat. No. 2,869,932 "Detachable Road Protecting Device . . ." issued Jan. 20, 1959. Similar to these latter constructions is the "Detachable Traction Lug" of Beach U.S. Pat. No. 2,129,557, issued Sept. 6, 1938.

Padilla U.S. Pat. No. 3,666,327 "Track Shoe Protector", issued May 30, 1972 shows a resilient block of material having integrally formed attachment lugs at its sides for engaging the side edges of a track element.

BRIEF DESCRIPTION OF THE INVENTION

It has long been known to the prior art that endless tracked vehicles, such as bulldozers, tractors and the like, will objectionably damage certain surfaces if driven thereover, such as roads, flooring, certain foundations, parking lots, etc. This damage will take place even where the vehicle is unloaded, merely from the inherent weight of such vehicles and the nature of their tracks and track elements.

It is also old in the prior art to attempt to provide resilient rubber or plastic composition pads for removable attachment to individual track segments, shoes or tread plates, whereby to attempt to cushion the impact of such vehicles on the surface being traversed, indeed, maintain the track itself entirely out of contact with such surface or road. Numerous prior art devices are seen in the patents listed in the preamble of this specification directed to this problem.

Unfortunately, these prior art devices have not solved the problem. While it is clear to the art that a resilient pad portion for a protector may be provided, almost invariably, such devices incorporate rigid over or under plate foundations or protectors. Yet further, the means for attachment of such devices, while many and ingenious, also have objectionable features which have prevented the commercial and practical adoption of the prior art devices.

Additionally, the provision of the capacity merely for the vehicle to traverse vulnerable surfaces on protective pads or like devices is often not sufficient advantage to justify the expense of the owner or operators of such vehicles investing in complete sets of road protective devices for each track element of paired track vehicles or every other one of same, etc. An additional facet or dimension of usability and usefulness is generally required. Specifically, that is, such road-protective devices, while necessarily easily applicable to and removable from the track element, additionally must permit either or both of loaded travel of the vehicle with respect to such vulnerable surfaces and/or maneuvering (even if limited) of the vehicle on such surfaces, loaded or not.

The optimum solution to this problem and technology would involve resilient rubber or composition pad protective devices readily attachable to and removable from individual track elements of endless track vehicles, which pads or elements and their attachments to the track elements are sufficiently rugged that loaded operation and maneuvering of the vehicle on the vulnerable surfaces will be practical for extended periods of time without loss of or damage to the protective devices or their attachments and, certainly, not to the road or other vulnerable surface on which the vehicle is traveling and/or working.

Thus, the optimum ideal in such situation would be to provide such resilient rubber or composition pads for attachment to individual track segments, shoes or tread plates which are readily attachable to and removable from the said track elements, yet which, in effect, are as strong, rugged and enduring, essentially, as the track elements themselves. With this sort of protective device, the versatility and usability of such vehicles vault into entirely new realms and dimensions of practical activity. However, the conditions and requirements for such pads, their tensioning and connecting means, as well as securing means, are of the utmost stringency and rigor because of the massive vehicles which are being dealt with, to say nothing of their loads.

The devices and constructions of the above mentioned U.S. patent applications to Chester A. and Lester A. Black disclose, show and describe such road protective devices permitting endless tracked vehicles to travel and, to a limited degree, to work and maneuver on vulnerable surfaces. However, in most cases, save with respect to the devices seen in Black et al. Ser. No. 612,217, supra, the heavier levels of work and operation, as projected above, are not encompassed. It is the purpose of the instant disclosure and specification to provide devices, connecting means, tensioning means and engaging means which fully meet these recited, most exacting goals and specifications above defined.

The instant improvement comprises somewhat resilient, somewhat flexible, somewhat deformable, yet shape-retaining blocks or bodies of rubber or plastic material which are of the length to overlie a substantial portion of the length of an individual endless track segment or plate on the outer surface thereof, with a width either somewhat less or considerably less than that of such plate or segment. Where the width approaches that of the track segment, only a single block is employed therewith. Where the width is considerable less than the plate or segment, a multiplicity of such blocks are used therewith.

Engaging means are provided which are capable of quick and ready attachment to and detachment from the side edges of the individual elements or track plates. Strong, non-extensible means are provided, further, positioned centrally of and within said pads or blocks of such nature as not to either substantially change the protective capacity of the block for the road surface or to be vulnerable to the crushing loads transmitted into and through the blocks themselves. Engaging or tensioning means of varied character are provided laterally of the blocks which are protected by the profile thereof under load. Thus the engaging means, non-extensible means and tensioning means provide, in combination, either an extraordinarily strong (though resilient) or entirely rigid connection or engagement of the pad with the track element it rides. There is additionally provided between the tensioning means and non-extensible means a connection which is workable in a limited fashion, providing a knuckle-like action, which enables the protective device block and its linkage with the track element to adjust to the bolt heads on the grouser or aggregate thereon or both.

OBJECTS OF THE INVENTION

A fundamental object to the invention is to provide improved detachable road protecting devices for tracked vehicles over those shown, disclosed and described in the U.S. patent application to Chester A. and Lester A. Black, Ser. No. 590,617, filed June 26, 1975 "Detachable Road Protecting Devices For Tracked Vehicles", particularly with respect to such devices usable under heavy duty conditions and on working vehicles.

Another basic object to the invention is to provide improved, heavy duty, working vehicle road protecting devices over those shown, disclosed and described in the U.S. patent application U.S. Ser. No. 612,217, filed Sept. 10, 1975, inventors Black et al. "Improvements In Detachable Road Protecting Devices For Tracked Vehicles".

Another object of the invention is to provide novel and improved such devices which may be readily and swiftly mounted on and removed from the individual tracks, plates or shoes of endless tracked vehicles such as tractors, bulldozers and the like.

Another object of the invention is to provide somewhat flexible, somewhat resilient and somewhat deformable (yet shape-retaining under very heavy loads) blocks of rubber or plastic material particularly adapted for use as road protecting devices when mounted on individual track elements of endless tracked vehicles, together with novel and greatly improved connecting, engaging the tensioning attaching means for same.

Another object of the invention is to provide such devices which do not require or have any vulnerable, crushable, or easily destructible elements, plates, structures or attaching means used or incorporated therewith or therewithin.

Another object of the invention is to provide such improved devices wherein such blocks of minimum width with respect to the track element width may be employed, yet wherein secure fastening is provided and full road protection is also available.

Another object of the invention is to provide such devices which are extraordinarily strong, very simple, relatively inexpensive, long lived under prolonged heavy-duty use, weather resistant, and effectively usable under the most extreme conditions with the most massive vehicles to accomplish their desired purposes.

Another object is to provide such devices readily adapted for use with all of the various sorts of track elements conventionally employed on endless tracked vehicles such as tractors and bulldozers, including standard and extreme service track shoes, as well as triple grouser shoes.

Another object of the invention is to provide such devices employing attaching, connecting and engaging means utilizing high tension and great force, yet wherein, because of the use of non-extensible elements of a particular character, and a connecting structure permitting a knuckle-type action, excessive stress and damage to the pad or block itself is minimized or avoided, even under the most heavy working conditions of the most massive vehicles.

Another object of the invention is to provide improved connecting and attaching means for such devices, which attaching and connecting means are of the greatest strength, either positioned out of the load thrust zones of the vehicles or of such character and position in the block as to be impervious thereto, same readily removable and replacable and, further, readily associateable with extensions and supports so as to provide the greatest versatility and usefulness.

Another object of the invention is to provide such improved heavy duty road protecting devices and attaching and connecting means therefor which, for the service provided, take up a minimum space, have minimum weight, and are relatively inexpensive.

Another object of the invention is to provide such improved heavy duty road protecting devices and attaching and connecting means therefor that a given block or device may be used as a single element on a single track element or in multiples or more than one block side by side thereon, the attachment and connecting means in all cases permitting the desired working or knuckle-type action necessary to optimum function.

Other and further objects of the invention will appear in the course of the following description thereof.

DESCRIPTION OF THE DRAWINGS

In the drawings, which form a part of the instant specification and are to be read in conjunction therewith, embodiments of the instant invention are shown and, the various views, like numerals are employed to indicate like parts.

FIG. 4 is a view taken along the line 4—4 of FIG. 3 in the direction of the arrows.

FIG. 5 is a fragmentary view of the central underside of the right hand side of the pad of FIG. 3, showing the access opening into the pad for implacement of the nut into the connecting member.

FIG. 6 is a front view analogous to the showing of FIG. 3, but here showing an extremely wide plate or track element having two road protecting devices of the type seen in FIGS. 1-5, inclusive mounted on the outer face of the said grouser, the pads being inter-connected centrally to one another and also gripped to the side edges of the track element.

FIG. 7 is an enlarged, fragmentary sectional view taken centrally through FIG. 6, showing the means for inter-connection of the two pads of FIG. 6 to one another, centrally of the view.

FIG. 8 is an enlarged, fragmentary, front view similar to the right hand half of the view of FIG. 6, but showing a modified form of road protecting device in the view, this device having a modified form of connecting element received therewithin to permit positioning of the road protecting block very close to the edge of the track element.

FIG. 9 is a front view of a modified form of road protecting device analogous to the device (and view) seen in FIG. 3 but showing the non-extensible element received within the pad having its bolt and nut engaging ends extended laterally of the sides of the pad, whereby the pad itself may remain integral and not require the access openings in the underside thereof.

FIG. 10 is a fragmentary frontal view of one side of a road protecting device or block, partly cut away for illustrative purpose showing a resilient cable non-extensible element in the pad.

FIG. 11 is a fragmentary, partly cut away, frontal view of one side of a pad wherein the non-extensible element in the pad is a chain.

FIG. 12 is a front view of another modified form of protective device analogous to the view of FIG. 3, but showing an alternative means of connecting one side of the block to the side edge of the track plate or element. The block is partly cut away for illustrative purposes.

GENERAL FEATURES

Figure 2:
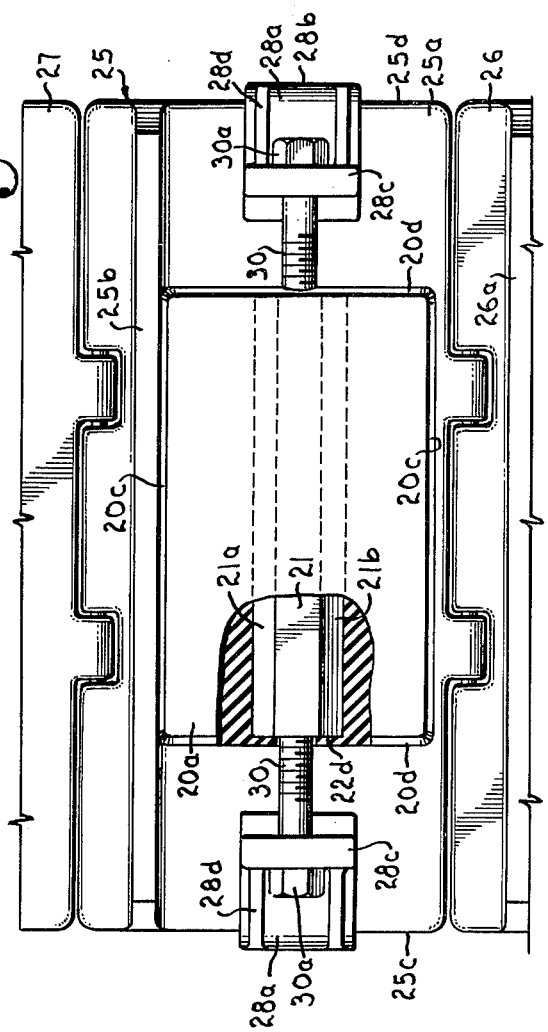
FIG. 2 is a top view of a first form of improved road protecting device mounted on a single element or plate of an endless track, a part of the resilient block or pad cut away to better illustrate the structure of the connecting member received within the pad.

The various Figures show relatively simple, relatively cheap, heavy-duty, working road-protecting devices readily adaptable to either standard service or extreme service track shoes, plates or elements. Endless trakcs (for bulldozers, tractors and the like) typically comprise elongate plates, generally of greater width than length, which are removably bolted or otherwise attached to an underlying drive structure. These plates articulate at their forward and rearward ends with one another and carry one or more ridges, cleats or spines extending across the width thereof. A standard service shoe has a lesser height single cleat, an extreme service shoe has a greater height single cleat and a triple grouser shoe typically has three ridges or cleats thereacross, spaced apart on the working surface of the shoe. These are merely typical variations and are not limiting. It is also important to note that each of these plates, shoes or elements typically has bolt or fastener heads of not inconsiderable dimension extending upwardly from the outboard surface of the plate. These bolt heads may be in any number, but typically are four to six, spaced apart from one another on the plate.

With respect to dimensions of the road protecting devices or pads, per se, to be described, all are significant. The length of the road protecting device in each case is preferably substantially the distance from cleat to cleat in succeeding track plates (refering to standard service or extreme service plates). Preferably, at least, one length of the pad is from the cleat or spine on the plate to the beginning of the arcuate part on the same plate so formed for meeting with the succeeding plate. Said otherwise, the length of the road protective pad or element is preferable substantially equal to the length of the flat portion of the track plate on which it will rest, at least. The maximum feasible length is the cleat to cleat distance. With respect to height of the pad or protective device, in a triple grouser shoe, where the pad or protective device is going to overlie at least one and possibly two of the cleats, the height or thickness of the pad need only be such (over the cleats) to provide the desired strength and resiliency, while the total height from the land or valleys between the grousers will be that thickness plus the depth of the lands or valleys. On the other hand, where the cleat is of standard or extreme height, the thickness or height of the road protective pad or device must be substantially greater than the height of the cleat, ridge or spine on the track plate so that, even under the load compression of the vehicle (which wil be spread over numerous of the road protective devices at any one moment), the cleats or ridges do not contact the surface being traversed. Since there is no reason to provide any substantial compressibility of the devices, the height of the grouser or cleat need not be exceeded by more than one or two inches in most cases.

The width of the road protective devices or pads, in all modifications, is going to be less and, in most cases, substantially less than the width of the tracks on which they set. It is the combination of the length and width plus the number of road protective devices applied to a given track which provides the square footage of bearing area. There must be enough (a sufficient number) of the road protective pads or devices, with a sufficient cross-sectional bearing area, that even the less resilient materials will not be simply squashed flat or cleat contact permitted. Since there are two tracks and a multiplicity of track elements, the number of protective devices used can be adjusted to the total weight of the vehicle (with positioning every second element, every other element, or, for the matter, every element-on both sides) that any conceivable vehicle loading can be handled. This may be important or critical in the case of extremely heavy, massive, tracked vehicle equipment. In the case of working or loaded vehicle protective device arrays, it is very common for at least every other element or every element on both sides of the track to be provided with the said pads or protective devices.

At any rate, the first consideration of width is that the block road protective device not be wider than the track in any case. The entire body of the device may closely approach the width of the track. On the other hand, the width may be very considerably less than the track width. Particularly this latter is so where more than one block is to be employed on a given track element. Generally speaking, assuming only one block is to be used on a element, it is desired to have the device as wide as possible, subject to providing track edge engaging and connecting means of the desired strength, type and versatility for the particular heavy-duty or working situation in question.

Summing dimension, generally speaking, the length of the device will preferably approach the cleat to cleat span as closely as possible, and at least incorporate the length of the flat portion of the track plate on which the device or pad will rest. Since there is some block resiliency, and since powerful connecting and engaging means are employed, an absolute flat surface rest is not required (with respect to aggregate on the track or the bolt heads protruding thereabove). Strong, powerful and variably adjustable engaging, connecting and tensioning devices having a knuckle or working action are employed which will pull the device down flush on the track element or into parallel relationship therewith. With respect to height, that height means must be provided which will space the tracked vehicle up above the surface being traversed enough that the cleats do not abrade or cut into the surface. Higher cleats require greater thickness or height in the road protective block or pad. However, the road protective devices can, if desired, always be provided in the greatest useful height and still serve with lesser height grousers or cleats efficiently and effectively. With respect to width, generally speaking, the maximum width with respect to a given width track, for a single block, is generally best, subject to the limitations mentioned above with respect to the edge connecting, engaging and tensioning devices employed therewith. However, as will be described, protective devices of very considerably lesser width will serve, per se, if positioned staggered alternatively between blocks, positioned asymmetrically on the track, or the like.

Typical spine to spine or cleat to cleat distances on tracks will run 5 inches to 8 inches, typically 6 inches. Track width in crawler tractors wll run, typically, from 12 inches to 30 inches, most approximately 18 inches to 22 inches. 3 inch cleat or grouser heights are extraordinary and a 3 inch thickness device will easily handle most cleat heights. All purpose protective devices of transverse and vertical rectangular section would conveniently be 5 and ¾ inches by 9 inches by 3 inches or 6½ inches by 14 inches by 3 and ¾ inches.

With respect to the shape of the blocks or pads in question, most preferably (since the areas on which the devices ride are rectangular) same are blocks rectangular in transverse and vertical section. The edges in all cases may be rounded and the devices may be frustoconical in both side and end section. The latter, however, is not preferably, because it is desired to have equal bearing areas on the road surface and the tracks, or substantially the same. In a rectangular pad, the outer face may be bevelled flatly or all four edges, if desired.

FIGS. 1–5, INCLUSIVE

FIGS. 1–5, inclusive, most specifically 2–5, inclusive, illustrate a first form or type of heavy-duty working type of road protective device or pad, together with the means for connecting the pad to and tensioning same on the individual track elements of the endless track. In these Figures, therein is seen a block or pad comprising a monolithic block construction having substantially flat, parallel top and bottom sides 20a and 20b of rectangular shape, flat, substantially parallel and rectangular ends 20c and flat, parallel, rectangular side surfaces or walls 20d. Integrally molded into and through pad 20, extending laterally substantially from side to side thereof, and preferably substantially centrally positioned both with respect to end walls 20c and top and bottom walls 20a and 20b, there is provided rigid, typically metal, such as steel, elongate, non-extensible bar member 21. In the preferred configuration of the bar member seen in the Figures, it comprises a three sided half-hexagon configuration best seen in FIGS. 4 and 2. This rigid, non-extensible member 21, of high strength material, preferably is of a length slightly less than the width of pad 20, whereby the hexagonal, inwardly facing socket members 22 having walls 22a–22d inclusive, do not extend laterally past the side faces 20d of block 20. Perforations or holes 23 are necessarily provided centrally of the outboard walls of the opposed socket members 22 whereby to receive the shafts of bolt members to be described. The inboard, facing recesses or wells 24 of the socket members 22 are illustrated as of preferred, hexagonal configuration whereby to receive therewithin nut members (to be described) with such tolerance that a working action of the nuts (and attached bolt shafts) may readily take place with respect to the socket members 22 and holes 23 therethrough, yet no rotation of the nuts therewithin be permitted. Alternatively, sockets 22 may be square, or even round if locking extensions are provided on the nuts to mate with recesses in the sockets, provided sufficient clearance is present for the necessary working or knuckle action. The hexagonal shape is optimum.

In the event a material is available for fabrication of the bar or strap 21 which is of sufficient strength and non-extensibility, same may be resilient transverse to its longitudinal axis. The criteria for bar or strap 21 are non-extensibility under heavy longitudinal load and great strength. Thus, compare the structures of FIGS. 10 and 11, to be described.

The downwardly extending flanges or legs of the half hexagon member 21 are numbered 21a and 21b, respectively. They form the upper half of the well or recess 24 bounded in its lower most part by wall 22a and upwardly extending flanges or legs 22b and 22c, respectively.

Figure 3:
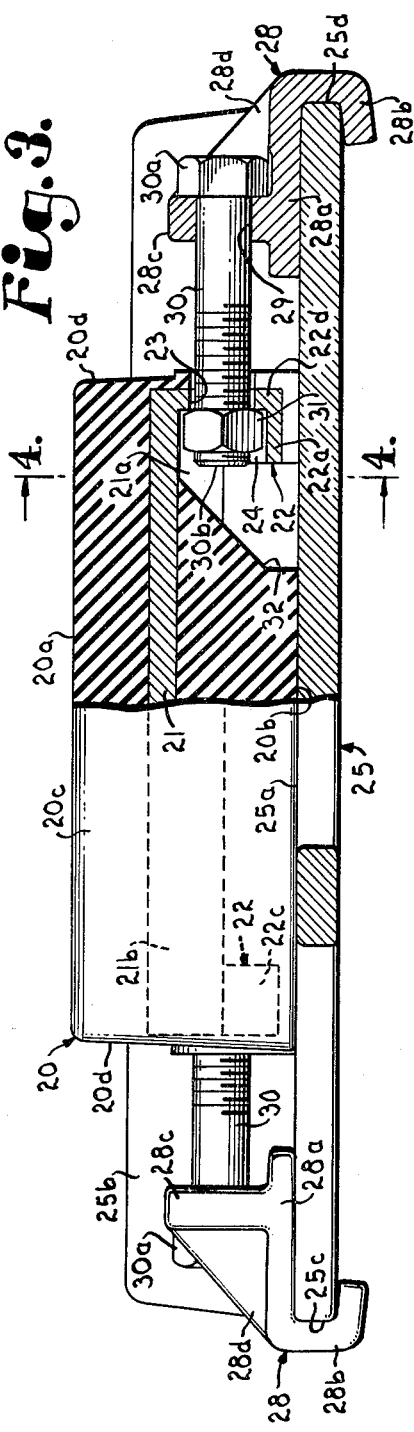
FIG. 3 is a front, partly sectional view of a road protecting device of the type seen in FIGS. 1-5, inclusive mounted on a single element of an endless track. Here the right hand side of the view is sectioned to better illustrate the inner connecting member construction and the connecting therewith to the track gripping element.

In FIGS. 2 and 3, the block 20 is shown mounted on a track element numbered 25, this element being shown coupled by conventional means (in FIG. 2) to preceding and following like elements 26 and 27. Only portions or fragments of plates 26 and 27 are visible. Element 25 has conventional cleat or grouser 25b closely adjacent the rear edge thereof (in normal forward motion of the track) extending upwardly at right angles thereto. The track elements 25-27, inclusive are coupled to one another and the underlying drive structure in conventional manner and by conventional means which will not be here described. This articulation is seen schematically, also, in FIG. 1. The outboard face 25a of track element 25 receives block 20 and its side edges 25c and 25d are gripped by the engaging elements to be described.

Turning, then, to the block 20 on track element 25 and the means for mounting and tensioning the same on that track element, on each side of block 20 there is seen a rigid, non-length adjustable hook member generally designated 28. Each such member has a flat base plate portion 28a, an outboard C-section engaging portion 28b and a normally vertical (with respect to the track element 25) plate or flange 28c fixed to or integral with plate 28a and having a bolt hole 29 therethrough. Bracing ribs or flanges 28d may be provided connecting plates 28a and flange 28c for reinforcement purposes. Conventional externally threaded bolts 30 having conventional hexagonal enlarged heads 30a typically engage flanges 28c through openings 29 therein, with the threaded ends 30b of the bolt shafts penetrating holes 23. Hexagonal nuts 31 threadably engage the said bolt ends 30b and are received in sockets 22.

Socket members 22 are duplicated at the opposite ends of member 21, with both sockets opening inwardly of the block 20. In order that access be provided to each of the sockets 22 for inserting and removing nuts 31, the under side of the pad is relieved centrally thereof closely adjacent each end thereof as at 32.

It should be understood that the track element plate 25 has 4 or more bolt heads of greater or lesser size extending upwardly from the flat outboard face thereof. Additionally, a greater or lesser quantitiy of road aggregate or dirt (mud, gravel, asphalt or the like) may be present on the outside face of the track element 25 when it is desired to apply the road protective device thereto. Accordingly, the essential improvement of the device of FIGS. 1-5, inclusive lies in the provision of the particular type of socket 22-nut 31-bolt 30 connection shown and described here. Specifically, that is, there is sufficient difference in internal dimension of the hexagonal socket with respect to the hexagonal nut that the nut will not rotate in the socket but may rock axially to a limited degree. Additionally, holes 23 are sufficiently larger than the outer diameter of the bolt shafts that the shafts may angle or cant in the openings. As a specific example, a socket of 1 3/16 to 1 5/16 inch size would accommodate a 1 ⅛ inch nut.

One great advantage of this construction is that the underside of plate 28a may be designed and so spaced with respect to opening 29 in flange 28c that it is horizontally in line with the underside of block 20 (face 20b) when the bolt shaft 30 is horizontal. If the knuckle action of the nut and bolt with respect to the socket and socket opening were not provided, the face 28a (underside face) would have to be normally positioned lower than the under face 20b of block 20 (beacuse of the bolt heads sticking up from the plate or element 25). In such case, as the pad wore down on the bolt heads, the bolt attachment at the ends or sides would tend to hold up the outer ends of the pad so that the wearing of the pad side outboard surfaces would be accentuated, particularly for the widest pads. Here the knuckle action permits the parallel plate 28a and block bottom surface 20b initial orientation with the knuckle action with respect to the bolt, nut and socket (as well as the bolt and opening 29 through flange 28c) enabling the pad, when placed on the bolt heads, to rise or rock upwardly. Then, when the bolts are tightened down, the block 20 is actually pulled down onto (forced down onto) the bolt heads, accommodating to them by its inherent resilience.

The material of the block, pad or protective device 20 may be rubber, reinforced rubber, monolithic rubber or lamented slabs of rubber vulcanized to one another. Alternatively, such may be of suitable plastic, reinforced plastic, rubber substitute (such as neoprene), or the like. Reinforcements in the rubber, neoprene, synthetic or plastic body may be fiberglass, resilient threads or cloth made up of resilient threads, nylon fibers and the like. Under the compressive load of the tracked vehicles to which the pads 20 are attached, the block must be somewhat resilient and deformable, at least slightly flexible.

Even though this working or knuckle action is present, there is provided, for the resilient block or pad itself, a 100% rigid connection from one edge of the track element to the other. That is, the hooks 28b (of element 28) engage the side edges of track element 25. Then bolts 30 and nut 31 make a rigid (when tightened down) connection to and between the socket elements connected to or integral with the ends of bar member 21. Thus, all force and tension, in the gripping of block 20 to the track edges and down onto the surface of the track element, is exerted into and through bar member 21 and thence to the pad, not directly to the pad. Thus, a compressive force, via bolts 30 and nuts 31, may be exerted on the entire unit which is of a strength and tension which permits the use of the pads or blocks 20 on the track elements 25 when the vehicle is used in working orientation or mode.

At the same time, it will be seen that the resilient material of the block 20 surrounds the sockets and bar member 21 whereby these members do not actually bear on the track and are received within the profile of the grouser or cleat 25b. Also important is the fact that the track edge engaging means, including flange 28c, is positioned within the profile of cleat 25b. Finally, the elements of the bolt 30 are also within this profile. Thus, when the great loads, thrusts and impacts of the working vehicle are imposed upon the protective device in operation, all of the elements of the connecting, tensioning and engaging means are either cushioned within the pad and of great inherent strength or sheltered within the profile of the pad and the grouser cleat 25b, as well as themselves being of great strength.

The advantages of having the socket members 22 within the block 20 itself lie in the fact that the blocks may be of greater width with respect to a given track element or oriented closer to one side of a track element, if desired. In the alternative form of FIG. 9 where the sockets are external of the pad, there is less structure within the pad of non-resilient character, but less versatility with respect to positioning the pad itself on a track element or with respect its side edges.

In FIGS. 1-5, inclusive, the protective blocks are seen mounted substantially centrally of the track elements in symmetrical position thereon. Typically, when mounting the blocks on the track elements, the bolts are engaged with the flanges 28c and the sockets 22 prior to setting the device on the track element. At this point, the bolts are backed off from the nuts. The knuckle actions at sockets and flanges permit the engaging of the hook members 28b with the track element side edges even though the block or pad be elevated by the bolt heads or aggregate on the track. As the bolts are threaded into the nuts (typically by a socket wrench), the powerful tensioning effect draws down the pad onto the bolt heads or into the aggregate essentially to the position seen in FIG. 3. In order to disengage the assembly, the bolts are backed off of the nuts.

Thus, in the device of FIGS. 1-5, inclusive, an elongate, non-extensible element is received substantially centrally of and secured within the block, extending transversely substantially from side to side of the block. Inwardly facing socket members are provided integral with or fixed to the ends of the non-extensible element. Means are provided for removably connecting the non-extensible element to the opposite side edges of an individual track element, these means positioned lateraly of the side faces of the block and here comprising members 28. Tensioning means (here bolts 30 and nuts 31) are positioned within the block and laterally thereof on both sides thereof engaging one end of the non-extensible element socket with an inboard portion thereof and the removable connecting means with an outboard portion thereof. Said otherwise, individual hook means are positioned laterally of each of the side walls of the block (which receive and contain the elongate non-extensible element and socket members) in positive, removable engagement with the track element side edges. A separate connecting element communicates between and interconnects each individual hook means and one end of the non-extensible element via the sockets. The connecting elements, in their connection between the hook means and the non-extensible element, placed the block under tension against the track element, thus retaining the block positioned on the outboard face of the track element.

Thus it may be seen that there has been provided here, as shown and described, a working road protecting device or block, specifically, that is, one which may be used in heavy duty action and work of an endless track vehicle. This device, once mounted on the track, is able to be fixed thereon against longitudinal thrusts and forces, lateral thrusts and forces and twisting or turning thrusts and forces. At the same time, the knuckle action illustrated enables the device to be mounted on an essentially uneven surface in a flexible fashion, thereafter to be tightly drawn down to the desired position by sheer tension and force exerted in the connecting, engaging and tensioning means thereof. Once the device is finally positioned and clamped (bolted) into place, there is a continuous, rigid, non-extensible coupling from one track element edge to the other. As will be seen with respect to later described modifications, this does not necessarily means the non-extensible element within the pad or resilient block itself is necessarily completely rigid, only that it is completely non-extensible. However, that structure and system just described is one which is immensely strong and rigid, yet one which does not defeat the basic goal of having a somewhat resilient, somewhat deformable, somewhat compressible, yet shape-retaining protective device bearing against the road and the track element, simultaneously, at all times.

In a device of the configuration of FIGS. 1-5, inclusive there is shown a rigid (non-extensible) track element edge-to-edge mounting involving a resilient block or pad, wherein each side of the connecting, engaging and tensioning means is length-adjustable. This permits the pad or block to be positioned centrally or to one side of the track element on which it is mounted. This particularly useful when the pad or block is of considerably lesser width than the width of the track element on which it sits. In such case, all of the blocks or pads may be positioned adjacent the outside edge of the track element or, alternatively, adjacent or alternate track pads may be staggered with respect to one another on adjacent track elements.

Additionally, and self-evidently, the length of the bolt 30 may be varied of each side. Yet further, the block may be relieved inwardly axially in line with the bolts in order to permit screwing the bolts deeper into the pad than the clear space provided by the relieving at 32.

FIG. 9

The device of FIG. 9 differs from the construction seen in FIGS. 1-5, inclusive in only three structural features as follows:

(1) The half hexagon center bar member is extended laterally past the sides of the block a sufficient distance that the sockets are sufficiently free of the side faces of the block that the nuts may be inserted into the sockets without interference with the pad;

(2) An optional flange is provided (or several of them) within the pad to achieve integral bonding of the bar member with the block and strutural integerity therewith; and (3) In view of the positioning of the socket members outside of the pad, the underside of the block or pad is not relieved for access to the sockets.

In view of the nature of these differences, common elements of the structures of FIGS. 1-5, inclusive and FIG. 9 are numbered the same, but primed in FIG. 9. These elements will not be again described, nor their function. The track edge engaging means are the same as seen in the previous FIGS. (1-5, inclusive). The flange or baffle 33 seen centrally of view of FIG. 9 is optional and may be hexagonal in configuration like the hexagonal sockets. Alternatively, a plurality of these may be employed spaced within the block or pad or, yet further, alternatively, a plurality of half flanges 34, closing the upper half of the hexagon, may be employed. These flanges anchor the bar member 21' in the block or pad more securely against working of the member 21' in the pad or tearing loose of same from the block.

This form is not preferred because:

(1) There is not as great a versatility with respect to positioning the block next the track element side edge or edges;

(2) The sockets 22' are vulnerable and may get clogged with mud or asphalt; and (3) For a given size track element, it is desired to have as wide a pad as feasible thereon.

This device, however, may be used as the construction of FIGS. 1–5, inclusive with respect to the double pad construction as seen in FIGS. 6 and 7. It is also important to note that one of the sockets may be received within the pad as seen in FIGS. 1–5, inclusive, with the other socket positioned externally of the pad. This is a combination of the structures of FIGS. 1–5, inclusive and FIG. 9.

FIGS. 6 AND 7

In these Figures, there is shown the method of using a pair of the pads of the structure of FIGS. 1–5, inclusive side by side on an extremely wide track element. In these views, the only difference in the structure between FIGS. 1–5, inclusive and FIGS. 6 and 7 lies in the use of the multiple pads and, in addition, the externally threaded shaft seen in FIG. 7 to couple the blocks together centrally. Otherwise, all of the elements are substantially identical and, therefore, like parts are numbered the same, but double primed with respect to the numbering of FIGS. 1–5, inclusive. The description of structure and function will not be again repeated as it is the same, save with respect to the structure of FIG. 7 which will now be described.

As seen in FIG. 7, an elongate cylindrical rod 35 is provided which is externally threaded and engagable with a nut 31" at each end thereof. The two nuts 31" are threaded onto the bar so that the desired length between the opposed side faces of the pads is provided. Then the assembly is engaged on the track with the hook members 28b" engaging the side edges of the track element. The bolts 30" are threaded into the nuts on the outermost sides of the respective blocks to draw down the blocks 20" tightly against the track element outer surface. Aggregate is seen in FIG. 6 at 36. Knuckle action is achieved at each end of each pad and doubly in the inter-pad connection centrally of FIGS. 6 and 7.

In all of the Figures, and all of the forms described, where a socket construction with a nesting nut (22–31) is seen, preferably lock nuts are employed of conventional type so that in working of the vehicle on the roads, the bolts will not loosen in their engagement with the nuts. Typical lock nut constructions are seen in the catalog of Maclean-Fogg Lock Nut Company of 1000 Allanson Road, Mundelein, Illinois 60060. These lock nut structures are well known in the art and do not constitute a part of the instant invention, but, in the use thereof, are optimum to avoid loosening, as noted.

FIG. 8

In the structure of FIG. 8, a modified track edge engagement is seen which puts one side of the pad very, very close to one edge of the track element. This construction is useful both in the double pad arrangement of FIGS. 6 and 7 and the single pad arrangement of FIGS. 1–5, inclusive, particularly when the pads are to be staggered (one adjacent one edge of the element, the next adjacent the other edge of the element) on the track.

In this construction, everything is identical with the block construction of FIGS. 1–5, inclusive except the right hand end of the non-extensible element and the extension thereof outside the pad. Accordingly, identical elements of the pad are numbered the same as in FIGS. 1–5, inclusive but triple primed. These identical elements will not here again be described either structurally or functionally.

In the novel part of this Figure, specifically, the right hand side thereof, the half hexagonal non-extensible element centrally of the pad is faired flat into a curved strap 40 which curves downwardly and out the side face of the pad adjacent the underside thereof, terminating in a hook member 41 adapted to engage the side edge of the track element.

In the event that the devvice of FIG. 8 is desired to be used on a wide track application as seen in FIGS. 6 and 7, typically, the outboard side of the track (with respect to the vehicle) will carry the form of FIG. 8 with a device as seen in FIGS. 6 and 7 (left hand side) put on the inboard side of the track element. A coupling as seen in FIG. 7 will join the two blocks together. With the inboard side having length adjustability, the entire assembly may be locked down on the track element as desired.

FIG. 12

Turning to FIG. 12, once again a portion (here the left hand side) of the road protective device is identical in construction to the device of FIGS. 1–5, inclusive. Accordingly, those identical parts (and the track element itself) are numbered the same, but quadruple primed. These same parts will not be again described herein.

In the right hand side of the Figure, the half hexagonal bar member 21'''' has the topmost portion thereof 42 extended horizontally (in the view) to the right with a downwardly extending rectangular (or hexagonal) member 43 integral therewith or rigidly fastened thereto. Member 43 has an opening or perforation 44 there through. The means for connecting the right hand side (in the view) of the road protecting block 20'''' comprises a hook member 45 having an elongage arm 45a connected thereto, the latter integral with or rigidly connected to an outboard hook member 46. This, then, is a double S hook device of rigid, non-adjustable character. The length adjustability in this form is provided by the bolt 30'''' engaging the socket 22'''' interior of the pad via the nut (not seen) and the connecting bracket 28'''' which grips the other side edge of the track element 25''''. It is evident that the socket member 22'''' could be positioned exterior of the block or pad as in the case of the device of FIG. 9.

In this case, while one of the connecting means is not length adjustable, nevertheless both sides have a knuckle action possible due to the nature of the connections with the rigid bar member 21''''. This device is cheaper than the device of FIG. 9, for example. It improves on the device of FIG. 8 in that S hook members of any desired length may be provided to couple with the element 43 through opening 44. Spring tensioned connectors (not shown) may be employed with this form, as well.

FIGS. 10 AND 11

Figure 1:
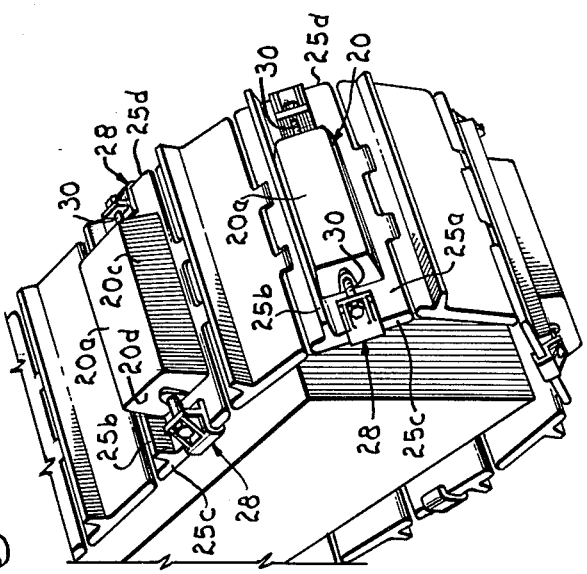
FIG. 1 is a schematic, fragmentary, three-quarter perspective view from above, showing a plurality of the improved road protecting devices of the type seen in FIGS. 2-5, inclusive attached to every other one of the plates or track elements of an endless track.

The views of FIGS. 10 and 11 show two variant or modified forms where the non-extensible member recieved within the pad or block is resilient transverse to its longitudinal axis. In such case, there is greater protection to the pad itself under the most extraordinary forces applied thereto as the non-extensible member there within can yield with the pad.

in FIG. 10, we have a track element 50 with an outboard flat face 51 (save for the bolt heads that extend upwardly therefrom and any aggregate thereon), this track element plate having a grouser or cleat 22 extending upwardly at right angles thereto in the same pattern of structure seen in FIGS. 1 and 2. A resilient block or pad 53, of the character described, has front face 53a and side face 53b. A hexagonal socket here designated 54 is received within the block 53 in the manner of the sockets of FIGS. 1–5, inclusive, there being the underside central recess 55 for access to the open side thereof analogous to recesses 32. A bolt member 56 having nut 57 threaded on the end thereof and received in socket 54 is shown in the same engagement relationship as described in the previous Figures. It is assumed a track element edge bracket or engaging means equivalent to 28 engages the enlarged head (not shown) of bolt 56.

In this form, the non-extensible element comprises a conventional high strength cable 58 of suitable steel wire makeup, the end of which is received in cap 59, the latter integral with or otherwise fixedly attached to bar extension 60 which is integral with or rigidly connected to the upper wall socket 54 (see FIG. 4 at 21). A washer or baffle 61, or a plurality of them may be integrally fixed to the exterior of cable 58 to anchor same in the block or pad 53.

The mode of attachment and removal of this form of the device is the same as previously described with respect to FIGS. 1–5, inclusive. While experience has shown that, even under heavy tension, the socket 54 will not tilt (bending or tearing the pad or block 53) because of the bearing surface of nut 57 and socket 54 and the bearing of the enlarged head of the bolt in the bracket at the edge of the track, if desired, two cable 58 may be attached centrally (at 54a) of the socket 54 with same being raised in the block (from the view of FIG. 10) to give a truly central pull on the socket with respect to the cable.

The device of FIG. 11 differs from that of FIG. 10 solely in the substitution of a chain (and its connection) for the cable of FIG. 10. Accordingly, like or common parts to FIG. 10 are numbered the same, but primed.

As may be seen in the view, attached to the upper end of the hexagonal socket 54' is a loop member 62 which receives one end link of chain 63. As in the case of FIG. 10, the other end may be identical, but reversed (sockets facing inboard of the pad) or a connection may be made in the manner of any of the other Figures, so long as an integral connection with the other end of the chain is made. As in the case of FIG. 10, also, two chains may be employed centrally connected to the sides of the socket adjacent 54a' to give a center connection and tensioning line, if desired. This is not necessary from experience. Greater strength is achieved with paired cables or chains, of course. In each case, with the center mounting of two chains or two cables, the socket 54 or 54' would be elevated somewhat in the block or pad.

In each of the cases of FIGS. 10 and 11, the socket 54 or 54' may be external of the pad analogous to the sockets of FIG. 9, at one or both ends of the pad or block 53 or 53'.

FURTHER GENERAL CONSIDERATIONS

All of the road protecting device attachment means, connectors and tensioners shown in the instant application (for working rod protective devices) share certain common characteristics. First, they include a non-extensible means or member within or associated with the pad which carries connecting members or engaging members on the side ends or extremities thereof. Secondly, there are means which engage the side edges of the track element. Thirdly, there are connecting and tensioning means between the latter means and the non-extensible means engaging, with the outboard ends thereof, the track element edge engaging hooks or connectors and, with the inboard portions thereof, the non-extensible means themselves or the engaging members on the extremities thereof. A knuckle or wobbling action (in initial engagement of the entire device on the track) is provided also. All of the entire connecting assemblies are received within and below the profile of the block or pad so that a considerable resilient portion of the pad extends both over and forward and backward thereof. Yet further, with respect to the non-extensible means, the resilient pad extends between same and the outboard face of the track element on which the block is carried. The pad additionally may be, in most cases, variably adjusted laterally so as to give versatility to a given width block or pad and its assemblage of engaging, connecting and tensioning means, with respect to being able to be used with more than one width of endless track elements.

As a specific example of the working pad (according to the disclosure of FIGS. 1–5, inclusive) a block of styrene butadiene rubber approximately 9 inches wide, 3 inches thick and 5 ¾ inches long is employed. Molded inside the block of rubber is a ¼ inch thick half-hexagonal bar member of spring or mild steal having the ends thereof with inwardly facing socket members integrally formed of the same material. A ¾ inch externally threaded bolt carries a 1 ⅛ inch lock nut removably threaded thereon and has a like hexagonal 1 ¼ inch bolt head. The hexagonal socket is approximately ⅛ of an inch larger. The socket may be substantially the length or depth of the nut which is about 6/10 of an inch. Inboard and outboard (with respect to the endless track) attachment clamps approximately 2 ½ inches wide and made of ¼ inch thick steel fit over the outside edge of the track or element on each side thereof. Each clamp has a 1 ½ inch by 2 ½ inch by ½ inch bar or plate securely welded to the top thereof having a hole therethrough greater than ¾ inches ID to permit the ¾ inch bolt play.

In testing, with respect to the particular pad and attachment described, with tractors weighing 12 tons or less, one pad on every other element is generally sufficient. With tractors weighing over 12 tons one pad on every element is strongly recommended. The 9 inch width pads or blocks can be used on single or double grouser shoes with a width from 12 inches to 22 inches. The same attachments can be used on the various widths of tracks by shortening or lengthening the ¾ inch attachment bolts. The pads can be moved from inside to outside of the element simply by adjusting the length of the bolt on either or both ends. For tractors with track elements that are over 20 inch width, pads 14 inches long, 3 ¼ inches thick and 17 inches wide may be employed by the same manner of attachments.

The subject devices have been tested in actual use in numerous heavy working applications. One application involves their use on D-7 caterpiller bulldozers and tractors having endless tracks with side mounted booms for handling heavy pipe. These vehicles approach 37,500 pounds without any load and, loaded, go well over 40,000 pounds. In street work, the vehicles, in handling the pipe, are often tilted at a 30° angle with one track on a mud pile and the other on the street. The solid mountings of the devices of this application handle even this type of heavy work on a continuous day-to-day basis, thus enabling the complete avoidance of destruction and tearing up of the street surfaces on which the vehicles and devices work.

These track block assemblies and road protecting device units permit working off-road use, as well as working use on finished or gravel or dirt roads. Thus the units or protectors can be retained on the tracks when moving from one road surface to another or from one work area to another even where the transit is across muddy or rough terrain, etc.

As previously mentioned, with respect to the importance of having resilient material on the underside of the pad next to the track plate element, there is universally going to be several, typically four, element bolt heads extending upwardly from the face of the track element. Where there is a steel plate on the underside of the resilient block (as in some prior art patents), same must be relieved to receive these bolt heads. This relief does not permit lateral adjustment of the said under plated pads on the element. This is not the case in the subject pad, as, in all circumstances, there is efficient resiliency on the underside of the pads to receive the said bolt heads and also permit the lateral adjustment of the pad over such bolt heads. Also, when the operator tightens the bolts, say of the forms of FIGS. 1-5, inclusive to 150 pounds torque, the pads snug down over the bolt heads, tensioned onto the track element outer face.

Such tensioning of the pads onto the track by turning down the bolts does not cause any bowing of the pad because of the knuckle action herein provided. In all cases, there is the provision of a flat upper surface, thereby preventing wear of the pad excessively on any given portion thereof.

FIG. 13

Figure 13:
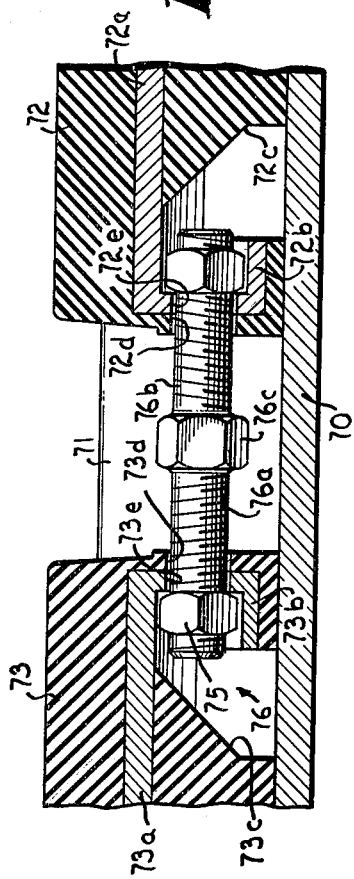
FIG. 13 is an enlarged, fragmentary, sectional view analogous to the view of FIG. 7 (showing the adjacent, opposed ends of two pads mounted on a single track plate or element), here showing the means for inter-connection of two pads of the structure of FIG. 8 to one another, where the outboard portions of the blocks or pads are engaged with the side edges of the track plate or elements with non-adjustable hooks.

Referring to FIG. 13, this view is a fragmentary frontal section through a pair of blocks of the construction seen in FIG. 8, the section and view showing the means for inter-connecting the opposed, adjacent ends of the blocks. The outer ends of the two blocks (not seen) are the same construction as the right hand side of FIG. 8, specifically, there is a hook construction extending from the lateral one side of the block adapted to removably engage the side edge of the track element. In such case, it is evident that, where two such resilient blocks are engaged by rigid hooks with the track element or plate side edges, it is necessary to provide the means for tightening down the assembly on the track plate or element centrally of the blocks or pads.

In FIG. 13, the normally flat, horizontal track element or plate is seen at 70, there being a cleat or grouser 71 extending upwardly at right angles thereto in conventional manner. A first block 72 of the character previously described with respect to FIG. 8 is positioned in the right hand side of the view and a second like block 73 in the left hand portion of the view. Block 72 has elongate beam 72a therewithin with hexagonal socket piece or member 72b adjacent the end thereof. Further, block 72 is relieved at 72c for insertion of a conventional hexagonal nut 74 into socket 72b as previously described. The end of the block or pad is relieved for a passage at 72d.

With respect to block 73, like parts are designated the same and will not be here again redescribed. The nut fitting in socket 73b is 75.

An elongate bar or double ended bolt member generally designated 76 has externally threaded cylindrical ends 76a and 76b with reversed threads thereon. These portions are threadably engaged with nuts 74 and 75, entering the blocks 72 and 73 through passages 72d, 73d, 72e and 73e. Centrally of bolt member 76 is hexagonal portion 76c.

In operation of the construction seen in FIG. 13, the blocks 72 and 73 are engaged centrally by nuts 74 and 75 being inserted in cavities 72c and 73c to be threaded on the oppositely threaded ends 76b and 76a of member 76. Once this is done, but loosely, the assemblage of two blocks 72 and 73 (see FIG. 8) may be engaged with the side edges of the track plate or element or approximately so engaged. When the two blocks are on the track element with the two hook members outboard of the track element side edges, the hexagonal central portion 76c of bolt member 76 is engaged by a suitable wrench, pliers or the like and the member 76 rotated so as to thread nuts 74 and 75 further onto member 76. This tightens the assemblage onto the track at any desired tension. To release, the member 76 is rotated in the opposite direction.

FIG. 14

In this Figure, there is shown another manner of mounting the knuckle action block, which is the subject of this instant application, on the track plate or element. This mounting construction is usable at both ends of a block or at one end of same. It also may be used with devices or blocks of the construction seen in FIGS. 8-11, respectively. All that is required is that the underside of the block be somewhat more relieved (see FIG. 5) in order that a bolt can be inserted into the socket of the rigid member in the block, rather than a nut.

Figure 14:
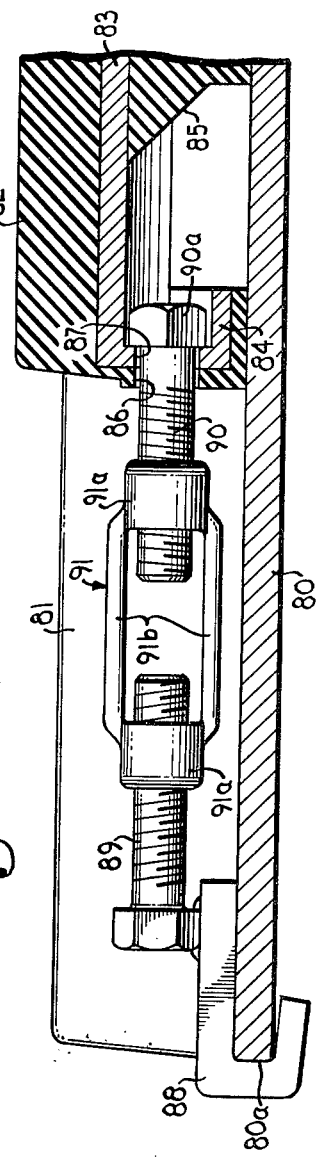
FIG. 14 is a fragmentary frontal section through a block mounted on a track element or plate, the block carrying therewithin the knuckle action socket structure with the means for engaging the pad or block with the side edge of the track element here illustrated as a turn-buckle.

At any rate, referring to FIG. 14, therein is shown a track element having a flat plate portion 80 to which is fixed, at right angles, conventional cleat or grouser 81. Block 82, here assumed to be of the same construction at the unseen end as the right hand side of the block of FIG. 8, has three sided, elongate, rigid bar member 83 therewithin to which, in the end seen, there is integrally fastened or provided hexagonal socket 84. The underside (central underside) of the block is relieved as at 85. Opening or passage 86 is provided in the end of the block, as is opening passage 87 in the hexagonal socket 84.

In order to removably engage the side edge of track element plate 80a, there is provided hook member 88 to which is welded or otherwise fixedly attached enlarged headed bolt 89. Hexagonal headed bolt 90 may be inserted through openings 86 and 87, as seen in FIG. 14 with the enlarged hexagonal head 90a thereof engaged in socket 84. The threads of bolts 89 and 90 run in the same direction so that, when opposed to one another as seen in FIG. 14, they are reversed. Turn-buckle element 91 (generally designated) has two internally threaded nut type members 91a threadable on bolts 89 and 90 and cage portion 91b connecting same centrally.

In operation of the device, with the bolt 90 mounted in the block 82, as seen, and the turn-buckle 91 engaging the externally threaded bolts, with the nut elements 91a backed off to the free ends of the bolts, the entire device may be fitted on the track plate 80. The turn-buckle cage is then rotated on the bolts to move nut elements 91a on the shafts of the bolts toward the enlarged heads thereof. This tightens the assemblage down on the track plate with the removal affected by the opposite rotation of the turn-buckle 91.

If block 82 is constructed like the block of FIG. 3, the turn-buckle engagement may be employed at both ends thereof. On the other hand, one end may have a greater relief as seen in FIG. 14, the other merely relieved as in FIG. 5 so that a nut must be inserted in the socket of the other end of block 82.

It may readily be seen that a use of a bolt, rather than a nut, in the socket may be employed with any of the forms seen in the previously described Figures, provided sufficient space is given that the shaft of the bolt may be inserted through the openings in the socket member and ends of the blocks.

Again referring to the knuckle action, in the various Figures, the following is noted. In FIG. 13, there is a knuckle action at each of the sockets in the view. In FIG. 14, there is a knuckle action only at the single socket seen in the view. (Unless there is another socket and knuckle action at the other end, not seen.) In the case of all of the knuckle action sockets seen in the various views, preferably, the freedom of the bolt head or nut in the socket is such, and the play of the bolt shaft through the socket and block end passages such, that the arcuate deflection possible of the bolt around its own axis is preferably at least 10 degrees in each direction (up and down) from the normally straight or horizontal mounting situation seen in the various Figures. This then, would be true laterally, also. However, when the apparatus configurations are tightened down, the alignment of the parts approaches the ideal seen in the various views with the exception of FIG. 6 which shows aggregate on the track. Said otherwise, the total knuckle action at each socket should be at least 20° from the line of lowest to highest deflection.

From the foregoing, it will be seen that this invention is one well adapted to attain all of the ends and objects here and above set forth, together with other advantages which are obvious and which are inherent to the apparatus.

It will be understood that certain features and subcombinations of utility and may be employed without reference to other features and subcombinations. This is contemplated by and is within the scope of the claims.

As many possible embodiments may be made of the invention without departing from the scope thereof, it is to be understood matter herein set forth are shown in the accompanying drawings is to be interpreted as illustrative and not in a limiting sense.

We claim:

1. Track and road protecting means for use with individual track elements of an endless tracked vehicle, successive track elements of said endless track having a transverse cleat on the outboard surface thereof adjacent one end thereof, comprising, in combination:
    a resilient, flexible and deformable block, shape-retaining under load and adapted to fit on the outboard face of a single track element of an endless track and positioned thereon,
    said block substantially rectangular in plan, side and end views and having substantially rectangular, paired and parallel sets of side faces, end faces and inboard-outboard load bearing faces,
    the length of said block a substantial part of the distance from cleat to cleat of successive elements,
    the height of the block substantially greater than the cleat height from the clean outboard surface of the track element, and the width of the block at least a substantial part of the width of the track,
    an elongate, non-extensible element received substantially centrally thereof and secured within said block and extending transversely thereof from side to side of the block,
    an inwardly facing socket member integrally fixed to each other of said non-extensible member and positioned substantially within the body of the block,
    each said socket member perforated substantially centrally thereof to receive therewithin, longitudinally axially of the block, a threaded member, said socket member internally configured to loosely fit over and cooperate with a nut member in such manner as to permit limited rocking action of the nut in the socket, but no rotation thereof,
    the underside of the block relieved centrally adjacent each end thereof for access to the socket member,
    a hook member on each side of said block to removably engage the side edge of a track element, and
    nut and bolt means on each side of said block to removably engage the socket member with the hook members and removably fix the block on a track element.

2. Means as in claim 1 wherein said elongate, non-extensible member is rigid.

3. Means as in claim 1 wherein said elongate, non-extensible member is non-rigid.

4. Track and road protecting means for use with individual track elements of an endless tracked vehicle, successive track elements of said endless track having a transverse cleat on the outboard surface thereof adjacent one end thereof, comprising, in combination:
    a resilient, flexible and deformable block, shape-retaining under load and adapted to fit on the outboard face of a single track element of an endless track and positioned thereon,
    said block substantially rectangular in plan, side and end views and having substantially rectangular, paired and parallel sets of side faces, end faces and inboard and outboard load bearing faces,
    the length of said block a substantial part of the distance from cleat to cleat of successive track elements,
    the height of the block greater than the cleat height from the clean outboard surface of the track element, and
    the width of the block at least a substantial portion of the width of the track,
    an elongate, non-extensible element received substantially centrally of and secured within said block and extending laterally thereof from side to side of the block and also extending laterally thereof of outside of said block on each side thereof,
    an inwardly facing socket member integrally fixed to each end of said non-extensible member outside of the body of said block,
    each said socket member perforated substantially centrally thereof to receive therewithin, and oriented longitudinally axially of the block, a threaded member, said socket member internally configured to loosely fit over and cooperate with a nut member in such manner as to permit limited rocking action of the nut in the socket, but no rotation thereof,
    a hook member on each side of said block to removably engage the side edge of a track element, and nut and bolt means on each side of said block to removably engage the socket members with the hook members and removably fix the block on a track element.

5. Means as in claim 4 wherein said elongate, non-extensible member is rigid.

6. Means as in claim 4 wherein said elongate, non-extensible member is non-rigid.

7. Track and road protecting means for use with individual track elements of an endless tracked vehicle, successive track elements of said endless track having a transverse cleat on the outboard surface thereof adjacent one end thereof, comprising, in combination:

a pair of substantially identical, resilient, flexible and deformable blocks, shape-retaining under load and adapted to fit side by side on the outboard face of a single wide track element of an endless track and positioned thereon, each said block substantially rectangular in plan, side and end views and having substantially rectangular, paired and parallel sets of side faces, end faces and inboard and outboard load bearing faces, the length of each said block a substantial part of the distance from cleat to cleat of successive track elements, the height of each block greater than the cleat height from the clean outboard surface of the track element, and the width of each block less than half of the width of the said wide track element, an elongate, non-extensible element received substantially centrally of and secured within each said block and extending laterally thereof at least substantially from side to side of the block, an inwardly facing socket member integrally fixed to each end of said non-extensible member, each said socket member perforated substantially centrally thereof to receive therewithin, and extending substantially longitudinally axially of the block, a threaded member, said socket members internally configured to loosely fit over and cooperate with nut members threaded on said threaded members in such manner as to permit limited rocking action of the nut in the socket, but no rotation thereof, a hook member on the outboardmost side of each of said blocks to removably engage the side edge of said wide track element, nut and bolt means on each outboardmost side of each said block to removably engage the outboardmost socket member of each said block with the hook member next thereto and removably fix the blocks in side-by-side relationship on the said track element, and an elongate, externally threaded rod member extending between and penetrating the inboard socket members on each of said block and threadably engaging a nut member received in the socket member in each said block next one another.

8. Means as in claim 7 wherein at least one of said socket members is positioned substantially within the body of the block and the underside of the block is relieved centrally adjacent the block end thereof for access to the said socket member.

9. Means as in claim 7 wherein at least one of said socket members is positioned externally of one of said blocks.

10. Track and road protecting means for use with individual track elements of an endless tracked vehicle, successive track elements of said endless track having a transverse cleat on the outboard surface thereof adjacent one end thereof, comprising, in combination:

a resilient, flexible and deformable block, shape-retaining under load and adapted to fit on the outboard face of a single track element of an endless track and positioned thereon, said block substantially rectangular in plan, side and end views and having substantially rectangular, paired and parallel sets of side faces, end faces and inboard-outboard load bearing faces, the length of said block a substantial part of the distance from cleat to cleat of successive track elements, the height of said block greater than the cleat height from the clean outboard surface of the track element, and the width of said block a substantial part of the width of the said track element, an elongate, non-extensible element received substantially centrally of and secured within said block and extending laterally thereof at least substantially from side to side of the block, an inwardly facing socket member integrally fixed to one end of said non-extensible member, said socket member perforated substantially centrally thereof to receive therewithin, extending substantially longitudinally axially of the block, a threaded member, said socket member internally configured to loosely fit over and cooperate with a nut member mounted on said threaded member in such manner as to permit limited rocking action of the nut in the socket and the threaded member in said socket perforation, but no rotation of the nut in the socket, a hook member on the side of the block having the socket member thereat to removably engage the side edge of a track element nut and bolt means on the last stated block side to removably engage the socket member with the hook member to removably engage the adjacent side edge of the track element, and means on the other side of the block to removably engage the other side edge of the track element with said non-extensible element.

11. Means as in claim 10 wherein said socket member is positioned substantially within the body of the block and the underside of the pad is relieved centrally adjacent the block end thereof for access to the said socket member.

12. Means as in claim 10 wherein said elongate, non-extensible element extends laterally outside of said block on the end thereof carrying said socket member, said socket member sufficiently positioned away from the side face of said block that said nut can be inserted therewithin.

13. Means as in claim 10 wherein said elongate, non-extensible member is rigid.

14. Means as in claim 10 wherein said elongate, non-extensible member is non-rigid.

15. Means as in claim 10 wherein the opposite end of said non-extensible member projects out of the other side face of the block, and a S-form hook element to removably engage said other end of said non-extensible element with one part thereof and the side edge of a track element with the other.

16. Means as in claim 10 wherein the other end of said non-extensible element protrudes past the opposite side face of said block and has a hook member on the end thereof adapted to engage the side edge of an endless track element.

17. Track and road protecting means for use with inidividual track elements of an endless tracked vehicle, successive track elements of said endless track having a transverse cleat on the outboard surface thereof adjacent one end thereof, comprising, in combination:

- a pair of substantially identical, resilient, flexible and deformable blocks, shape-retaining under load and adapted to fit side by side on the outboard face of a single wide track element of an endless track and positioned thereon in such spaced relationship,
- each said block substantially rectangular in plan, side and end views and having substantially rectangular, paired and parallel sets of side faces, end faces and inboard and outboard load bearing faces,
- the length of each said block a substantial part of the distance from cleat to cleat of successive track elements,
- the height of each block greater than the cleat height from the clean outboard surface of the track element, and
- the width of each block less than half of the width of the said wide track element,
- an elongate, non-extensible element received substantially centrally of and secured within each said block and extending laterally thereof at least substantially from side to side of the block,
- an inwardly facing socket member integrally fixed to the opposed ends of said non-extensible members,
- each said socket member perforated substantially centrally thereof to receive therewithin, extending substantially longitudinally axially of the block, a threaded member, said socket members internally configured to loosely fit over and cooperate with nut members threaded on said threaded member, in such manner as to permit limited rocking action of the nuts in the sockets, but no rotation thereof,
- an elongate, externally threaded rod member extending between and penetrating the opposed socket members of each said block with the opposite ends thereof and threadably engaging a nut member received in the socket member of each said block next one another, and
- means on the outboardmost side of each of said blocks to removably engage the side edges of said wide track element with the ends of said non-extensible elements adjacent thereto.

18. Means as in claim 17 wherein said latter means comprises, at least on one side of said track element, a hook member on the outboardmost side of one of said blocks to removably engage the side edge of said wide track element, and

- nut and bolt means on said outboardmost side of said one block to removably engage a like outboardmost socket member on the non-extensible member of said block with the hook member next thereto.

19. Means as in claim 17 wherein at least one of said socket members is positioned substantially within the body of the block and the underside of the block is relieved centrally adjacent the block end thereof for access to said socket member and insertion of a nut member therein.

20. Means as in claim 17 wherein at least one of said socket members is positioned externally of the side face of one of said blocks a sufficient distance that a nut member may be inserted therein and removed therefrom.

* * * * *